US008258917B2

United States Patent
Cai et al.

(10) Patent No.: US 8,258,917 B2
(45) Date of Patent: Sep. 4, 2012

(54) INTUITIVE MULTIPLE DEGREES OF FREEDOM PORTABLE CONTROL DEVICE

(75) Inventors: Steven Cai, Orange, CT (US); Paul J. LeBlanc, Thomaston, CT (US); Thomas R. Ecsedy, Woodbury, CT (US); Leslie W. Yoho, New Fairfield, CT (US)

(73) Assignee: Measurement Systems, Inc., Wallingford, CT (US)

( * ) Notice: Subject to any disclaimer, the term of this patent is extended or adjusted under 35 U.S.C. 154(b) by 25 days.

(21) Appl. No.: 13/034,079

(22) Filed: Feb. 24, 2011

(65) Prior Publication Data
US 2011/0234369 A1  Sep. 29, 2011

Related U.S. Application Data

(60) Provisional application No. 61/309,886, filed on Mar. 3, 2010.

(51) Int. Cl.
*G09B 21/00* (2006.01)
(52) U.S. Cl. ............ 340/4.13; 340/4.11; 340/4.12; 700/245; 700/246; 700/247; 700/248; 700/249; 700/250; 700/251; 701/2; 701/3; 180/167; 180/168; 180/169
(58) Field of Classification Search ........ 340/4.11–4.13; 700/245–251; 701/2–3; 180/167–169
See application file for complete search history.

(56) References Cited

U.S. PATENT DOCUMENTS

| | | | |
|---|---|---|---|
| 2004/0257021 A1 | 12/2004 | Chang et al. | |
| 2005/0099177 A1 | 5/2005 | Greelish | |
| 2005/0194194 A1 | 9/2005 | Delson | |
| 2005/0200325 A1* | 9/2005 | Kim et al. | ......... 318/568.12 |

* cited by examiner

*Primary Examiner* — George Bugg
*Assistant Examiner* — Ojiako Nwugo
(74) *Attorney, Agent, or Firm* — Wiggin and Dana LLP

(57) ABSTRACT

A control device for a vehicle or mechanism includes a portable displacement controller which permits a non-technical user to achieve effective control of the vehicle or mechanism, by moving the portable displacement controller intuitively with little learning effort. A first sensing device, attached to the displacement controller, detects the user's controlling motion. A second sensing device, attached to the object being controlled, detects motion thereof. An interface device receives signals from the sensing devices, processes those signals to determine relative motion of the controlling motion and the object's motion and outputs a control signal in accordance with the processed signals. The sensing devices each detect motion in six degrees of freedom; the sensing devices each include a three-axis accelerometer, a three-axis gyroscope, and a three-axis magnetometer. In specific embodiments, the accelerometers, gyroscopes, and magnetometers include micro-electromechanical system (MEMS) devices.

50 Claims, 16 Drawing Sheets

INTUITIVE MULTIPLE DEGREES OF FREEDOM PORTABLE CONTROL DEVICE

CROSS-REFERENCE TO RELATED APPLICATIONS

This application claims the priority benefit of provisional U.S. Application No. 61/309,886 filed Mar. 3, 2010, the entire disclosure of which is incorporated herein by reference.

FIELD OF THE DISCLOSURE

This disclosure relates to control devices, and more particularly to portable devices for controlling other devices capable of movement with multiple degrees of freedom (including but not limited to vehicles).

BACKGROUND OF THE DISCLOSURE

Conventional isotonic or displacement type of hand controllers such as joysticks and yokes rely on a cumbersome kinematic mechanism to restrict a human operator's three dimensional movements into a confined space. Mechanical linkages such as shafts, gears, bearings and springs, etc. are employed as necessary to transfer motions from the human operator to the electronic sensors attached to the mechanism. Widely used sensors such as potentiometers, transformers, Hall effect sensors, magneto-resistive sensors, optical and magnetic encoders, etc. can measure movement only along a single axis. Control devices employing these sensors make indirect measurements of the operator's movements and impose limitations on the design of a human machine interface (HMI). In order to provide a controller with capability in more than two DOFs (degrees of freedom), a conventional approach is to connect or stack several single- or two-axis mechanisms together. Controllers constructed according to this approach are complex to implement and awkward to use. In addition, using such a controller is not intuitive for the user; this lengthens the user's learning curve.

Due to inherent kinematic requirements, the mounting location and alignment of the sensors in such devices are often restricted, for example, to be at or near a pivot axis. Design flexibility and configurability are therefore limited.

Conventional control devices are often installed permanently to a fixed platform due to the size and weight of the kinematic mechanism. It is cumbersome to remove such equipment. In addition, when a conventional control device is mounted in a moving vehicle, the motion sensors therein may be susceptible to fictitious forces. Furthermore, these devices generally contain moving components that are subject to friction, backlash, binding, and deterioration over time and under changing environmental conditions, which thus impact their long-term reliability. Their size and weight often make such devices not suitable for portable or wearable applications.

SUMMARY OF THE DISCLOSURE

In accordance with the disclosure, a control device is provided for a vehicle or mechanism. This control device includes a portable displacement controller which permits a non-technical user to achieve effective control of the vehicle or mechanism, by moving the portable displacement controller intuitively with little learning effort.

According to a first aspect of the disclosure, a control device includes a displacement controller operable by a user of the device. A first sensing device is attached to the displacement controller and is configured to detect a controlling motion performed by the user. A second sensing device is attached to the entity being controlled, the second sensing device configured to detect motion thereof. An interface device is operatively connected (via cable, or wirelessly) to the first sensing device and the second sensing device. The interface device is configured to receive signals from the first sensing device and from the second sensing device; to process those signals to determine relative motion of the controlling motion and the motion of the entity being controlled; and to output a control signal for controlling the entity in accordance with the processed signals. In embodiments of the disclosure, each of the first sensing device and the second sensing device is configured to detect motion in six degrees of freedom; each of the first and second sensing devices includes a three-axis accelerometer, a three-axis gyroscope, and a three-axis magnetometer. In these embodiments, the accelerometers, gyroscopes, and magnetometers are micro-electromechanical system (MEMS) devices. The first sensing device detects the controlling motion relative to a first reference frame in accordance with a geomagnetic field local to the first sensing device, and the second sensing device detects the motion of the entity relative to a second reference frame in accordance with a geomagnetic field local to the second sensing device. In other embodiments, the displacement controller is wearable by the user; the displacement controller may be secured to the user's arm, hand or finger, to perform the controlling movement.

According to another aspect of the disclosure, a system for controlling a mechanism includes the above-described features and also includes an operating device (e.g. a host computing device) connected to the mechanism and configured to operate the mechanism. The interface device outputs a control signal to the operating device so as to control the mechanism in accordance with the processed signals. In an embodiment, the mechanism is a vehicle; the second sensing device, the interface device, and the operating device are located on the vehicle; and the displacement controller has the first sensing device disposed therein and is remote from the vehicle. In other embodiments, the displacement controller may be attachable to and detachable from a mounting base in the vehicle, or may be fixed thereto.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

A control device according to the present disclosure is a displacement type control device operated by a human hand or hands, or a body segment when a human hand is not accessible. The device does not have conventional movement sensors and does not require a kinematic mechanism. Direct motion measurement is achieved by employing a combination of MEMS (micro-electromechanical systems) sensors arranged into modules, as detailed below.

Each MEMS sensing module contains a three-axis MEMS accelerometer, a three-axis MEMS gyroscope and a three-axis MEMS magnetometer in a compact package having a volume less than 0.2 cubic inch. Each module thus has the capability to measure acceleration, angular rotation rate and geomagnetic field in the sensing module's body coordinate system with respect to Earth. This capability provides a total of six degrees of freedom (DOFs), a significant advantage in terms of form factor over conventional electronic sensors.

In addition, the MEMS sensing modules do not contain any moving components, thus eliminating associated issues such as friction, wear, mounting restrictions, etc. Accordingly, a displacement controller embodying the disclosure offers the benefits of MEMS sensing technology, may be portable (or wearable), capable in multiple DOFs, and also adaptable to conventional devices involving kinematic mechanisms.

Figure 1:
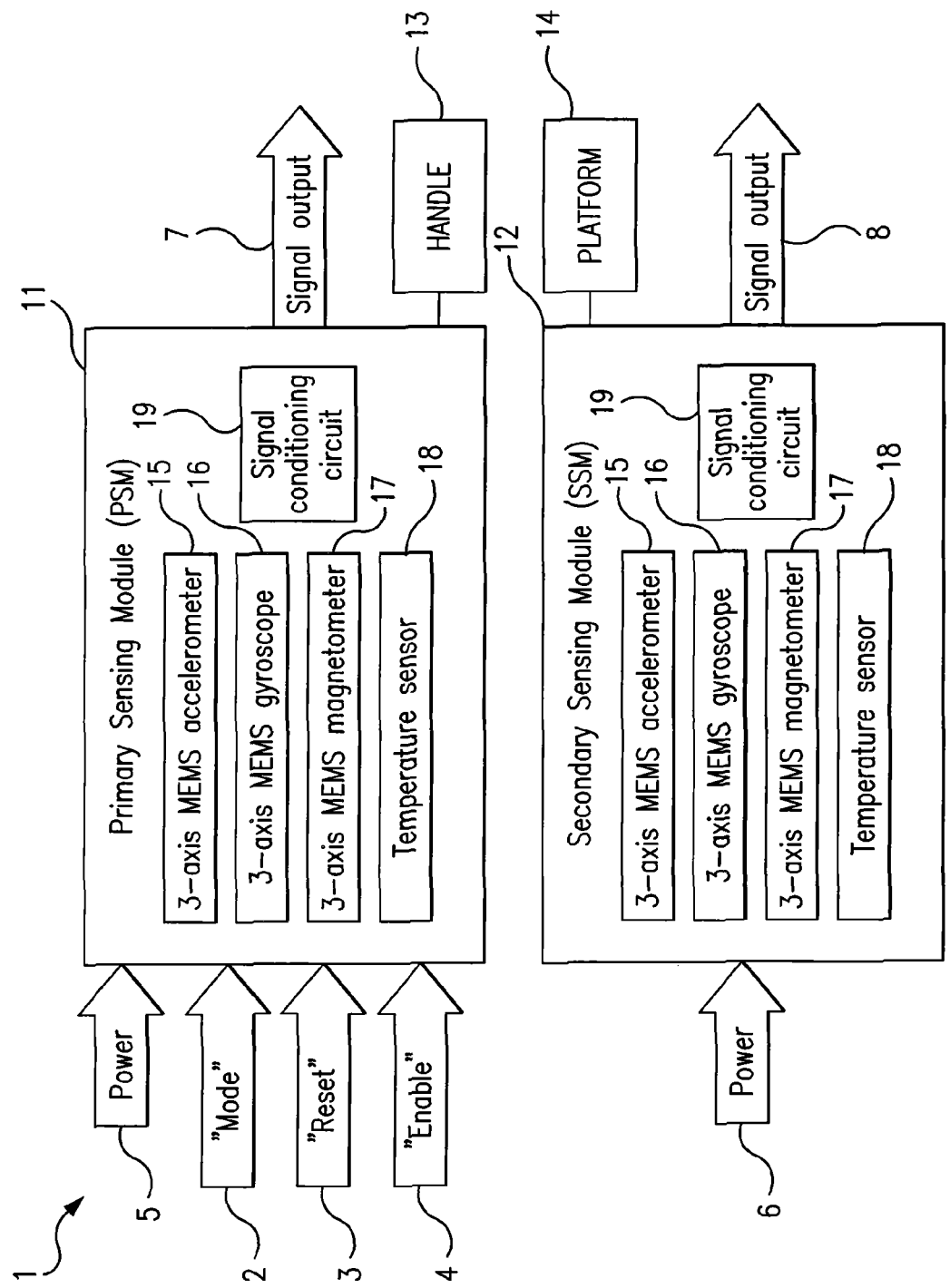
FIG. 1 schematically illustrates a Primary Sensing Module (PSM) and Secondary Sensing Module (SSM) used in embodiments of the disclosure.

As illustrated schematically in FIG. 1, a control device 1 according to the disclosure includes a Primary Sensing Module (PSM) 11 and a Secondary Sensing Module (SSM) 12. The PSM senses movement of a handle 13, operated by a user of the device, relative to a platform 14. Because MEMS inertial sensors rely on Earth's gravitational field for a reference frame, the effect of platform motions needs to be separated from the motions of control handle 13; this is done by measuring the platform motions using SSM 12. The platform 14 serves as a reference frame for the motions of handle 13; the SSM senses movement of the platform relative to the environment. For example, platform 14 might be installed in a moving vehicle whose motion is detected by SSM 12, while PSM 11 measures motions of handle 13 held by an operator. It is not necessary for handle 13 to be physically connected to platform 14.

In this embodiment, PSM 11 includes a three-axis MEMS accelerometer 15, a three-axis MEMS gyroscope 16, a three-axis MEMS magnetometer 17, a temperature sensor 18, and a signal conditioning circuit 19 in a compact package having a volume less than 0.2 cubic inch. PSM 11 is attached to handle 13 at any convenient location. SSM 12 likewise includes a three-axis MEMS accelerometer 15, three-axis MEMS gyroscope 16, three-axis MEMS magnetometer 17, temperature sensor 18 and signal conditioning circuit 19 in a compact package with a volume less than 0.2 cubic inch. In general, platform 14 is located where the control device is to be used; this may be (for example) a ground vehicle, a ship, or a human body.

PSM 11 and SSM 12 have power inputs 5, 6 and signal outputs 7, 8 respectively. PSM 11 also has inputs labeled "Mode" 2, "Reset" 3 and "Enable" 4, discussed in detail below. PSM 11 and SSM 12 are connected to a host system through a Host Interface Module (HIM), as shown schematically in FIGS. 11-13.

Each sensing module 11, 12 measures accelerations and angular rotation rates in its own body coordinate system. For example, with reference to FIG. 2, PSM 11 (disposed in the lower portion of handle 13, as shown by dashed lines) measures accelerations of handle 13 in the x, y, and z linear directions and the pitch, roll, and yaw angular directions. Positional data including pitch, roll and yaw orientations are initially predicted using a navigation algorithm, discussed below with reference to FIG. 14.

Figure 3A:
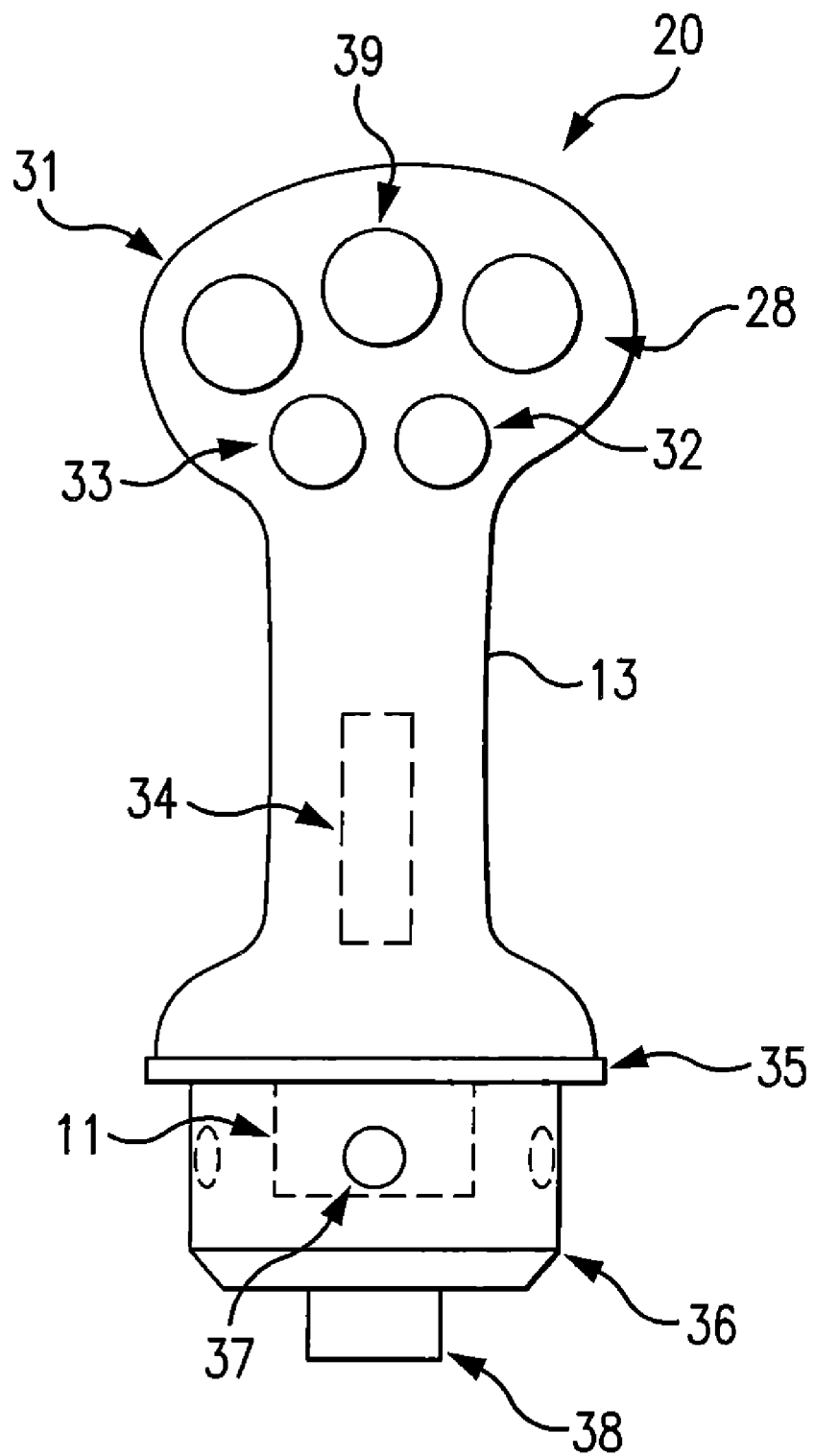
FIG. 3A illustrates a single handle control device according to an embodiment of the disclosure.

FIG. 3A shows some details of a portable single handle device 20 according to an embodiment of the disclosure. Handle 13 has an ergonomic grip portion 31 at one end and is attached to mounting plate 35 at its other end. PSM 11 is mounted to the opposite side of mounting plate 35 and is enclosed by an adaptor 36. In a further embodiment, adaptor 36 is configured for mechanical connection to a mounting base, using ball detents 37; adaptor 36 also includes an interface connector 38 when the connection to the mounting base is not wireless.

Handle 13 is preferably rugged and ergonomically shaped for operation by a human hand or hands, or a body segment. In this embodiment, grip portion 31 includes "Mode" and "Reset" switches 32, 33, the operation of which is described below. Grip portion 31 also has space to contain optional controls 28 such as switches, mini-joysticks, thumbwheels, etc. Controls and switches 28, 32, 33 in this portion of the handle are conveniently located for actuation by a user's thumb.

Because inertial motion sensors are always live when powered, unintended movements of the handle may lead to output errors. In this embodiment, such errors are prevented by recognizing sensor signals from the PSM only when "Enable" switch 34 is activated. "Enable" switch 34, conveniently located for actuation by pressure from a user's palm, is activated only when depressed and deactivated when released. The host system connected to the device is notified when the "Enable" switch is deactivated, e.g. when the device is left unattended by the user or in the event the user accidentally drops the handle. The host system is configured to ignore undesired PSM outputs (that is, outputs while switch 34 is deactivated).

Alternatively, one or more SSMs may be mounted on the user (e.g. secured to the user's hand, arm or finger, or attached to or built into the user's clothing) to detect and cancel unintended user motion relative to the displacement controller (in this embodiment, single handle device 20).

"Reset" push button switch 33 is activated only when depressed and deactivated when released. Switch 33 is located for easy access as shown in FIG. 3A for a single handle grip (see FIG. 7 for a dual-handle grip). The host system responds to a "Reset" signal (that is, when switch 33 is depressed) by resetting the digital outputs to default null values set during a previous calibration, and re-centering the device's output positions. This is analogous to using mechanical springs to return a conventional positioning device to a center position. In portable device 20, there is no mechanical force present to return to a center position; instead, device 20 includes a non-volatile memory and "Reset" switch 33. The memory holds the previous center position data and is refreshed until the "Reset" switch is depressed and released. The "Reset" button may be used to reestablish the reference frame of either or both of the PSM and SSM. The "Reset" switch has additional functions when combined with the "Mode" switch 32, as described below.

In a further embodiment, grip portion 31 includes a "Hold" push button switch 39; depressing the "Hold" switch allows the user to bring the displacement controller back to a neutral position without altering the current displacement or orientation of the device under control (DUC). For example, a robot arm could be moved forward 24 inches by moving the displacement controller forward 12 inches, depressing the "Hold" switch, returning the displacement controller to its previous position, releasing the switch, and again moving the displacement controller forward 12 inches. (In this example, the user's controlling motion and the DUC motion have 1:1 scaling; other ratios may be used, as discussed below.)

"Mode" push button switch 32 is activated only when depressed for a period of approximately 5 to 10 seconds and then released. Activation of switch 32 causes the device to enter a calibration mode. The lengthened period required for activation ensures that the calibration mode is entered only when intended by the user.

Figure 3B:
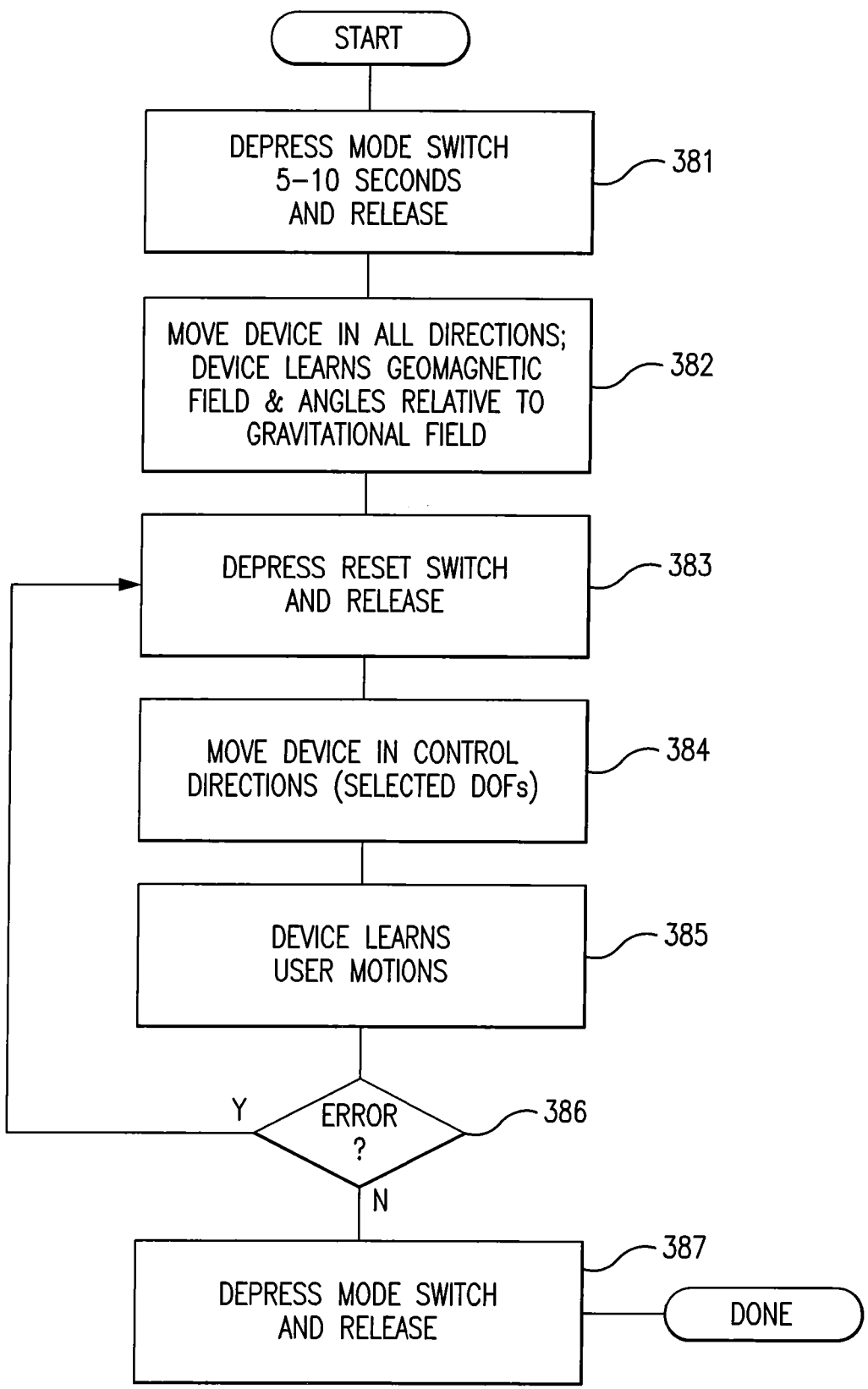
FIG. 3B illustrates steps in a calibration method for the control device of FIG. 3A.

Steps in a calibration procedure for a displacement controller device, according to an embodiment, are shown in the flowchart of FIG. 3B. The user depresses the "Mode" switch 32 for approximately 5 to 10 seconds, and then releases the switch, to activate the switch (step 381). The user then moves the device in a full range of directions intended for use, and the device learns the geomagnetic field in its surroundings and angles relative to earth's gravitational field (step 382). The user then depresses and releases the "Reset" switch 33 (step 383). The device will then enter the calibration mode. During calibration, the user moves the displacement controller device only in the directions to be used for control purposes (step 384). By default, the device assumes that all six DOFs will be used. However, the user may select only a particular combination of three translations and three rotations (out of a total number of possibilities of 64, or $2^6$)—an analogy to mechanical gating in conventional control devices. The device learns that combination from the user's gestures (step 385). If the user believes an error has been made (step 386), the user presses and releases the "Reset" button to re-start the calibration. The user presses and releases the "Mode" switch again (step 387) to complete the calibration and exit the procedure.

It will be appreciated that a given user's set of motions and gestures may be applied to a variety of devices under control (DUCs). Conversely, a given DUC might be controlled by any of a plurality of users with differing types and ranges of motion. A user's calibration motions and gestures accordingly may be scaled to represent the dynamics of a particular DUC controlled by that user. For example, a child controlling a toy might cause the toy to move 6 inches in response to a 12 inch motion (scale 1:2), while a disabled person controlling a full-size vehicle might cause the vehicle to move 5 feet in response to a 1 inch motion (scale 60:1).

Furthermore, the system (which generally includes the displacement controller, HIM, SSM, and host system) may include a non-volatile memory and a display device, and may support control of a given DUC by a plurality of users, each having his/her own set of motions and gestures. In particular embodiments, the non-volatile memory is located either in the displacement controller, the HIM, or both. The calibration motions and gestures for each user may be stored in the non-volatile memory, and retrieved for use by the system in accordance with a user logging on to the system or selecting his/her name from a list of users displayed on the display device by the system. In an embodiment, the system may also include a device for signaling to the user when the user executes a motion or gesture outside the range of calibrated motions.

Alternatively, the system may be configured to perform a dynamic calibration of user motions (both intended and unintended motions) by monitoring and learning the dynamics of the system; that is, learning the types, DOF and range of motions performed by the user and detected by the displacement controller, by the SSM, and by the DUC.

Figure 4A:
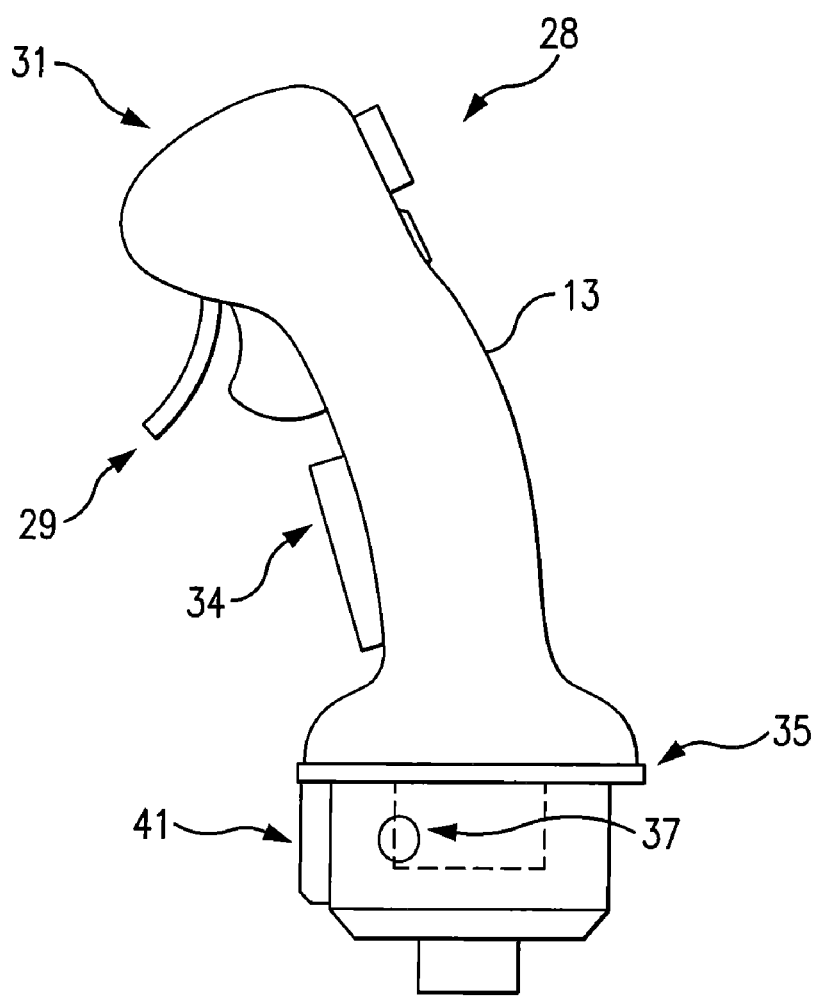
FIGS. 4A and 4B are side and bottom views, respectively, of the single handle control device of FIG. 3A.
Figure 4B:
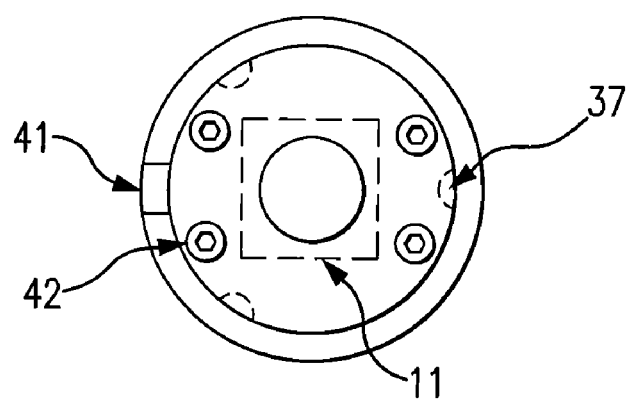

FIGS. 4A and 4B are side and bottom views, respectively, of the single-handle device of FIG. 3A. "Enable" switch 34 is shown in profile in FIG. 4A. In normal operation, handle 13 is gripped by the user so that "Enable" switch 34 is adjacent to the user's palm. A trigger-type switch 29 may be located on the same side of the handle, convenient to the user's forefinger. The bottom view of FIG. 4B shows fasteners 42 for the enclosure of PSM 11, as well as ball detents 37 and alignment key 41 for positive mounting of adaptor 36 to the mounting base.

Figure 5:
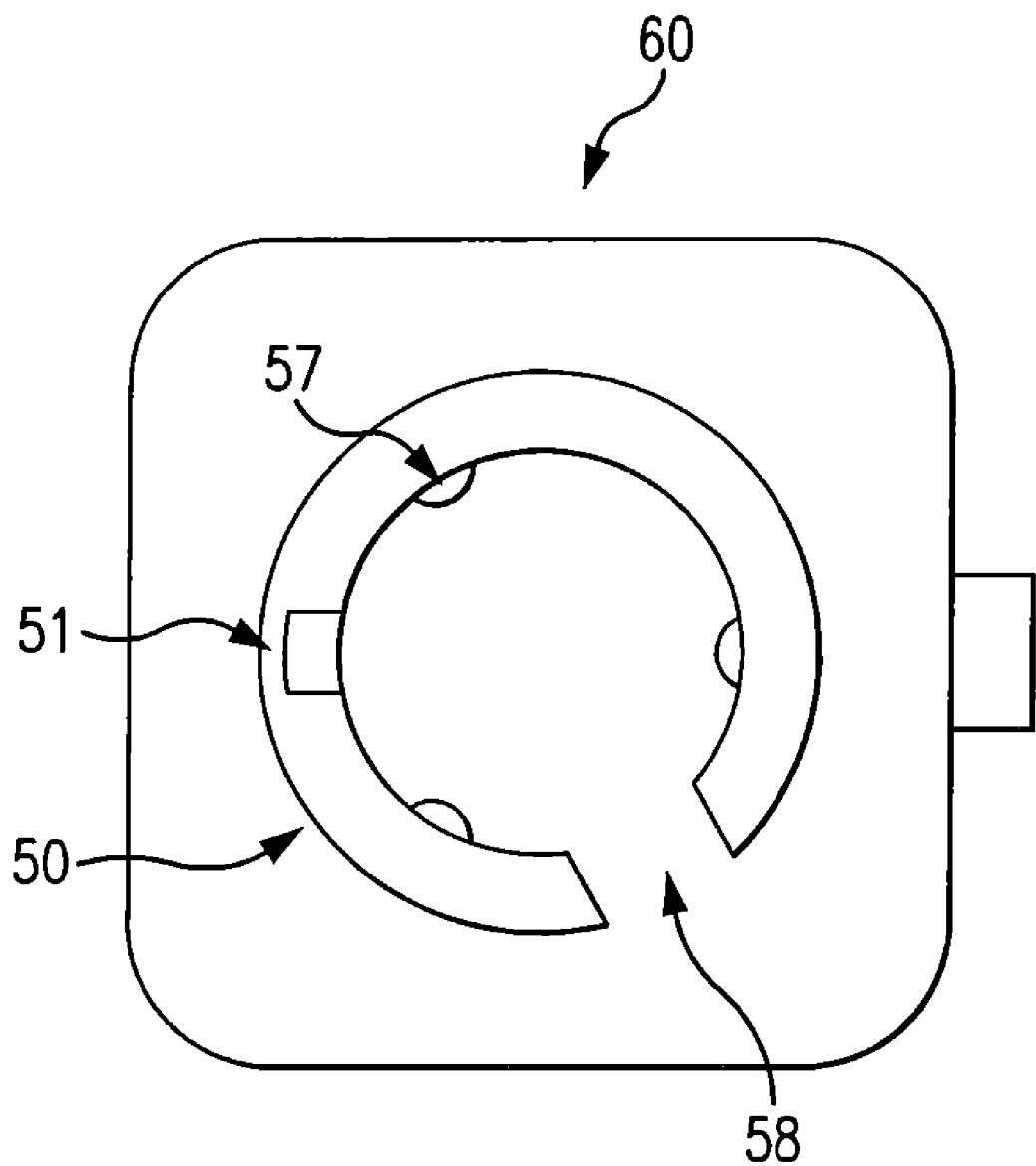
FIG. 5 is a top view of a mounting base for mounting the single handle control device of FIG. 3A.
Figure 6:
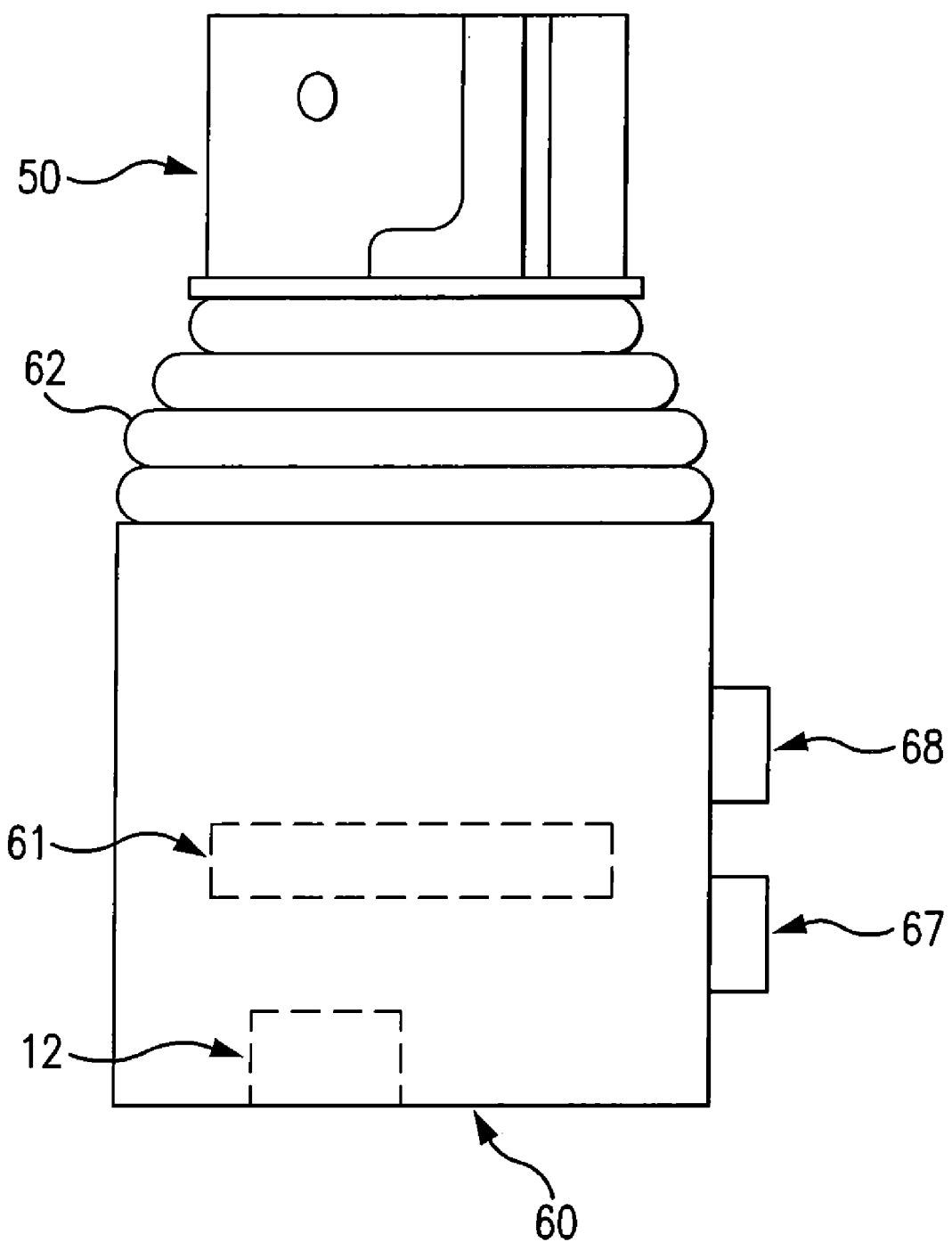
FIG. 6 is a side view of the mounting base of FIG. 5, suitable for attaching to a vehicle platform.

FIGS. 5 and 6 are top and side views, respectively, of a mounting base 60 on which portable single handle device 20 (such as shown in FIGS. 3A and 4) is mounted, in accordance with an embodiment. As shown in FIG. 5, mounting base 60 includes a cradle 50 for connecting to adaptor 36. Cradle 50 includes a keyway 51 for mating with alignment key 41, and ball plungers 57 for mating with ball detents 37. In a specific arrangement where handle 13 connects to base 60 via an interface cable, cradle 50 has an opening 58 for the cable.

Portable device 20 thus may be quickly attached to or detached from mounting base 60. It will be appreciated that device portability removes the analogy for certain mechanical gating features such as cross-gate or speed shift gate. The adaptor 36 provides the user flexibility to switch between a portable device and a device fixed to base 60, according to the user's preference.

FIG. 6 shows additional details of mounting base 60. Cradle 50 connects to the lower portion of the mounting base via a flexible bellows or collar 62. In this embodiment, mounting base 60 includes SSM 12 and HIM 61, and interface connectors 67, 68 for connecting to the host system and the PSM respectively. Mounting base 60 is configured for attachment to platform 14. When the platform is a moving vehicle, SSM 12 measures the motions of the vehicle and thus provides a frame of reference for the motions of the control handle.

Figure 7:
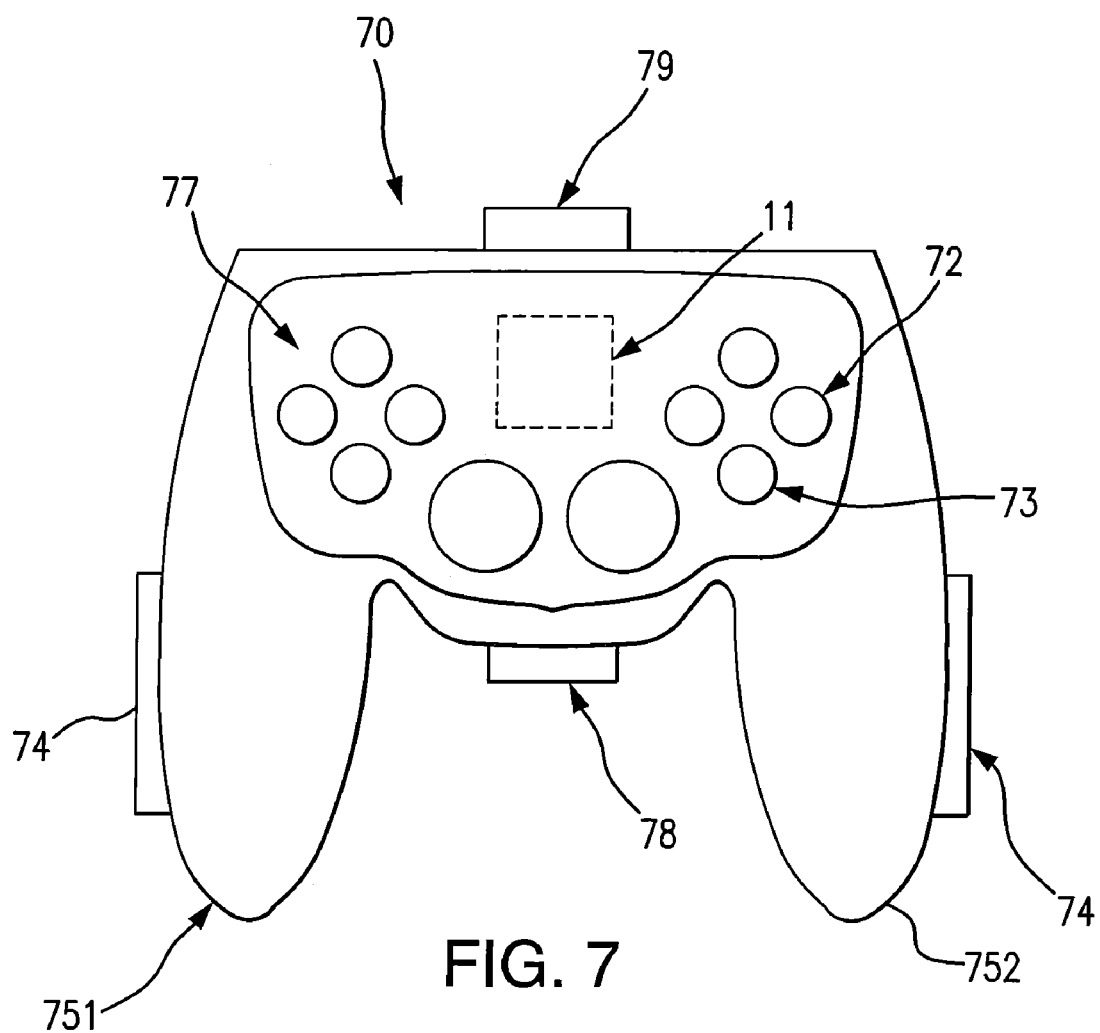
FIG. 7 illustrates a dual handle control device according to another embodiment of the disclosure.
Figure 8:
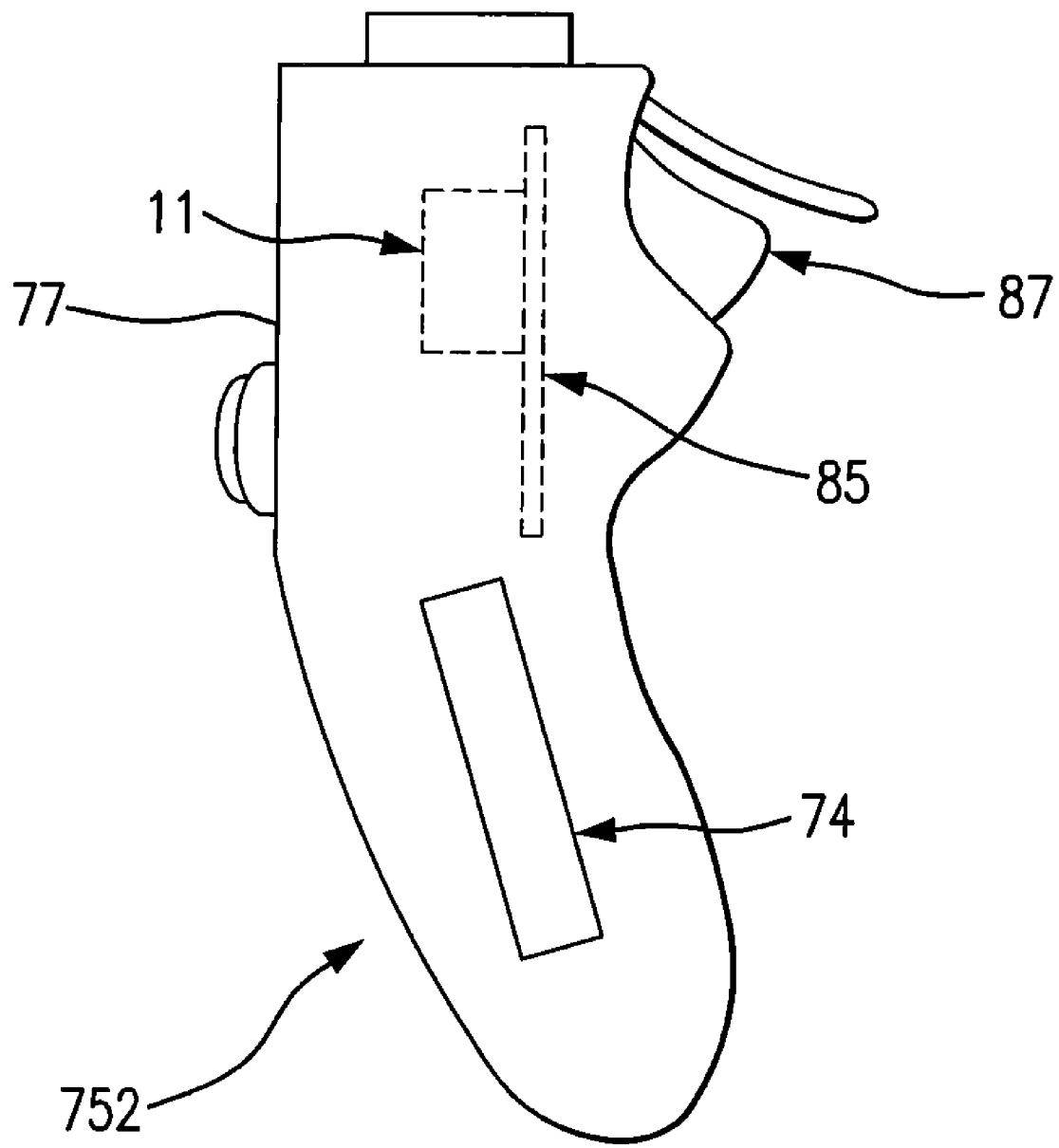
FIG. 8 is a side view of the dual handle control device of FIG. 7.

A dual-handle controller 70, according to another embodiment of the disclosure, is shown in FIGS. 7 and 8. Controller 70 has two ergonomic grip handles 751, 752; the user may activate "Enable" switch 74 using either hand. In this embodiment, PSM 11 is mounted in the central portion of the controller. Control panel 77 has space for various thumb-operated switches, including particularly "Mode" switch 32 and "Reset" switch 73. Connectors 78, 79 permit attachment of interface cables if required. FIG. 8 is a side view of controller 70, showing the right-hand grip handle 752. PSM 11 is mounted to mounting plate 85 in the interior of the controller. "Enable" switch 74 protrudes from the exterior surface of handle 752, convenient to the user's palm. In normal operation, the control panel 77 is convenient to the user's thumb, while a trigger-type switch 87 is located on the opposite side of the handle, convenient to the user's forefinger.

Figure 9:
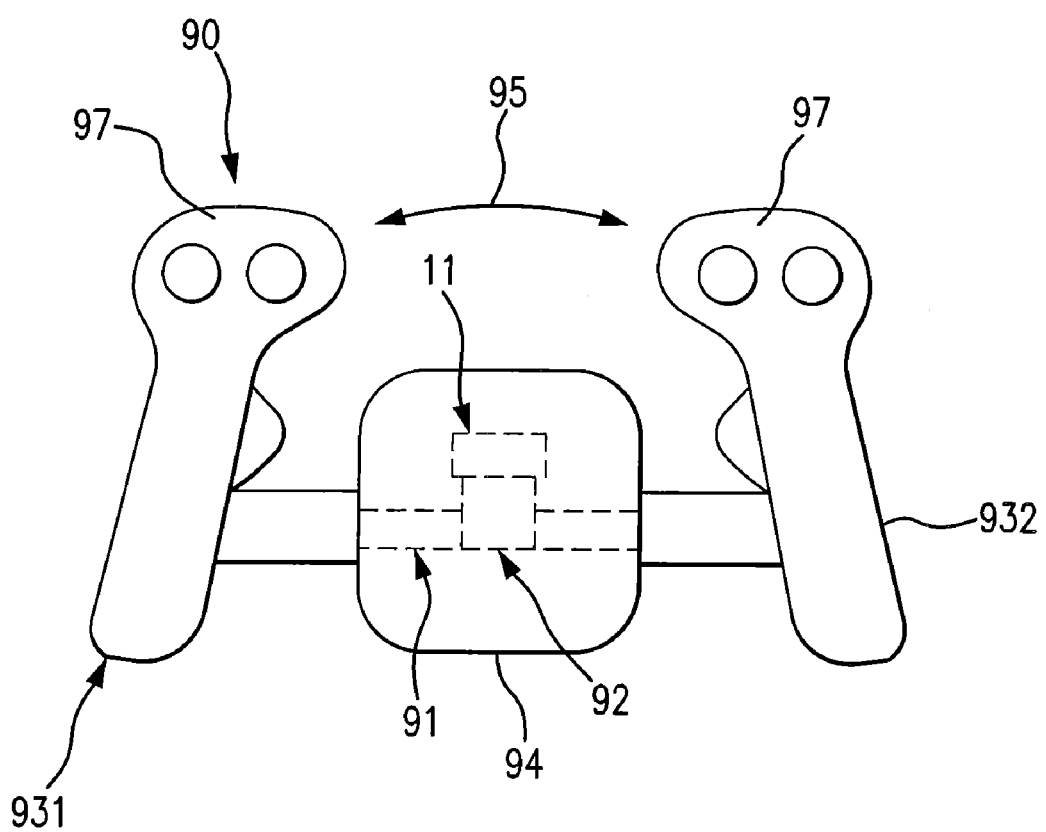
FIG. 9 illustrates another dual handle control device, according to an additional embodiment of the disclosure.
Figure 10:
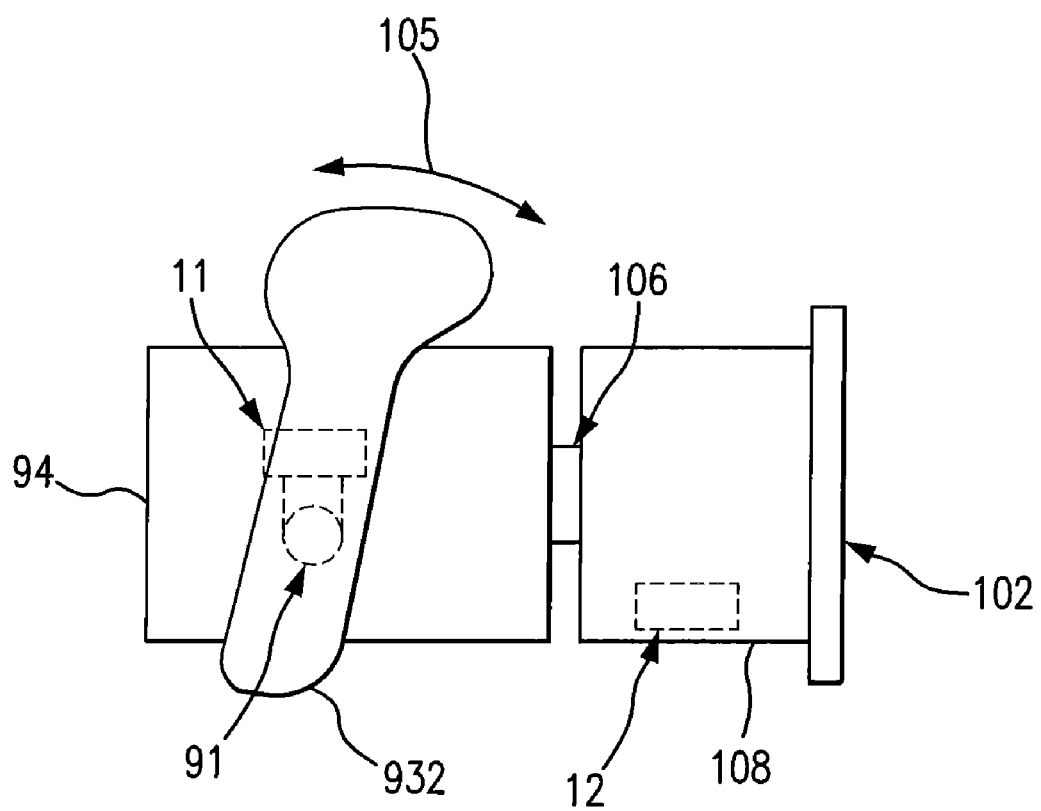
FIG. 10 is a side view of the dual handle control device of FIG. 9.

Another arrangement of a dual-handle controller, according to a further embodiment, is shown in FIGS. 9 and 10. As shown in FIGS. 9 and 10, controller 90 is a two-axis controller, measuring azimuth rotation (yaw) 95 and elevation rotation (pitch) 105. Controller 90 has two ergonomic grip handles 931, 932, each having an area 97 with space for thumb-operated switches. In the central portion 94 of the controller, PSM 11 is mounted on mounting bracket 92 in the central portion 94 of the controller. Mounting bracket 92 is connected to elevation shaft 91 running between the grip handles. FIG. 10 is a side view of controller 90, showing the right-hand grip handle 932. In the embodiment shown in FIG. 10, the central portion 94 of controller 90 mounts onto mounting base 108, so that controller 90 and mounting base 108 are connected by azimuth shaft 106. Similar to the arrangement of FIG. 6, mounting base 108 includes SSM 12, and has an attaching portion 102 for attachment to platform 14. When the platform is a moving vehicle, SSM 12 measures the motions of the vehicle and thus provides a frame of reference for the motions of the controller handles.

Figure 2:
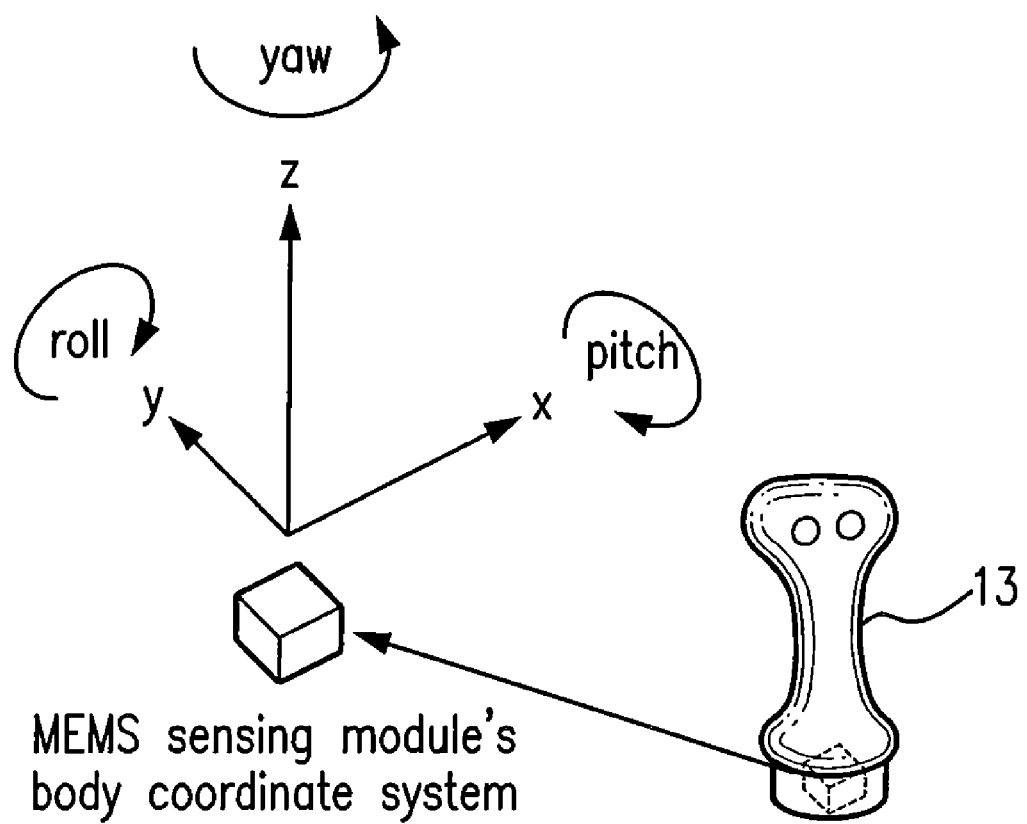
FIG. 2 schematically illustrates a sensing module measuring accelerations and angular rotation rates in its own body coordinate system, in accordance with embodiments of the disclosure.

PSM 11 in controller 90 measures both azimuth rotation about azimuth shaft 106, and elevation rotation about elevation shaft 91 (see also FIG. 2). Separate sensors for the azimuth rotation and elevation rotation are not required as in conventional arrangements. This serves to illustrate the simplicity of controllers using MEMS sensing technology.

It is understood that controllers embodying the disclosure may have a variety of sizes, shapes, and configurations, and that the examples described herein of single-handed and dual-handed controllers are not limiting.

Figure 11:
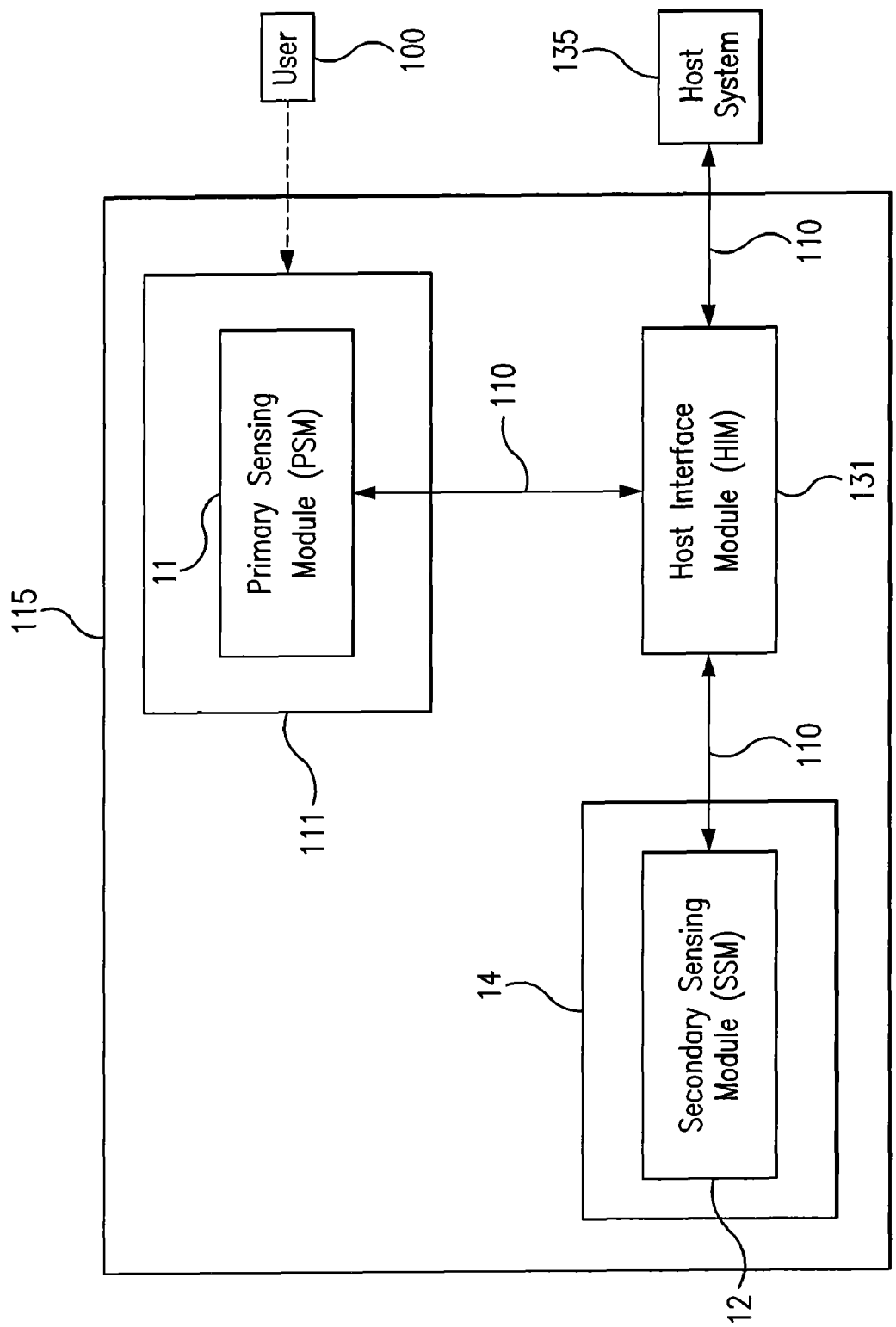
FIG. 11 schematically illustrates a Human Machine Interface (HMI) system including a Host Interface Module (HIM) connecting to a platform with an SSM, a controller with a single PSM, and to a host system, in accordance with an embodiment of the disclosure.

In accordance with another embodiment, a Human Machine Interface (HMI) 115, which serves as an interface between a user 100 and a host system 135, is shown schematically in FIG. 11. The HMI includes a controlling device 111 with PSM 11, a platform or mobile reference 14 with SSM 12, and a Host Interface Module (HIM) 131 which contains electronic hardware and software. The hardware includes a digital signal processor, a microprocessor as CPU, non-volatile memory, and a digital interface for communication with the host system. In this embodiment, the controlling device, platform, HIM and host system are interconnected using cables 110. (In general, cables are used only when wireless communication between components is not preferred.) The HIM 131 may be mounted on the platform 14 or at another convenient location. In particular, the HIM 131 and SSM 12 may be combined into one module for ease of portability.

In a particular configuration of HMI 115, according to an embodiment, the PSM is user-wearable; that is, mounted onto the user 100 (e.g. secured to the user's arm, hand or finger), or attached to or built into the user's clothing. Thus, in a remote weapons control application, a soldier may control the weapon by movement of his arm, hand or finger.

The relationship among PSM, SSM and HIM is shown in FIG. 11 for a simple HMI system which contains a single PSM/SSM pair. A more complex HMI system 125, serving as an interface between user 100 and host system 135, is shown schematically in FIG. 12A. HMI system 125 includes a controlling device 121 with multiple PSMs 11-1, 11-2, . . . , 11-N and a platform 14 with a single SSM 12 used as a common reference.

Figure 12A:
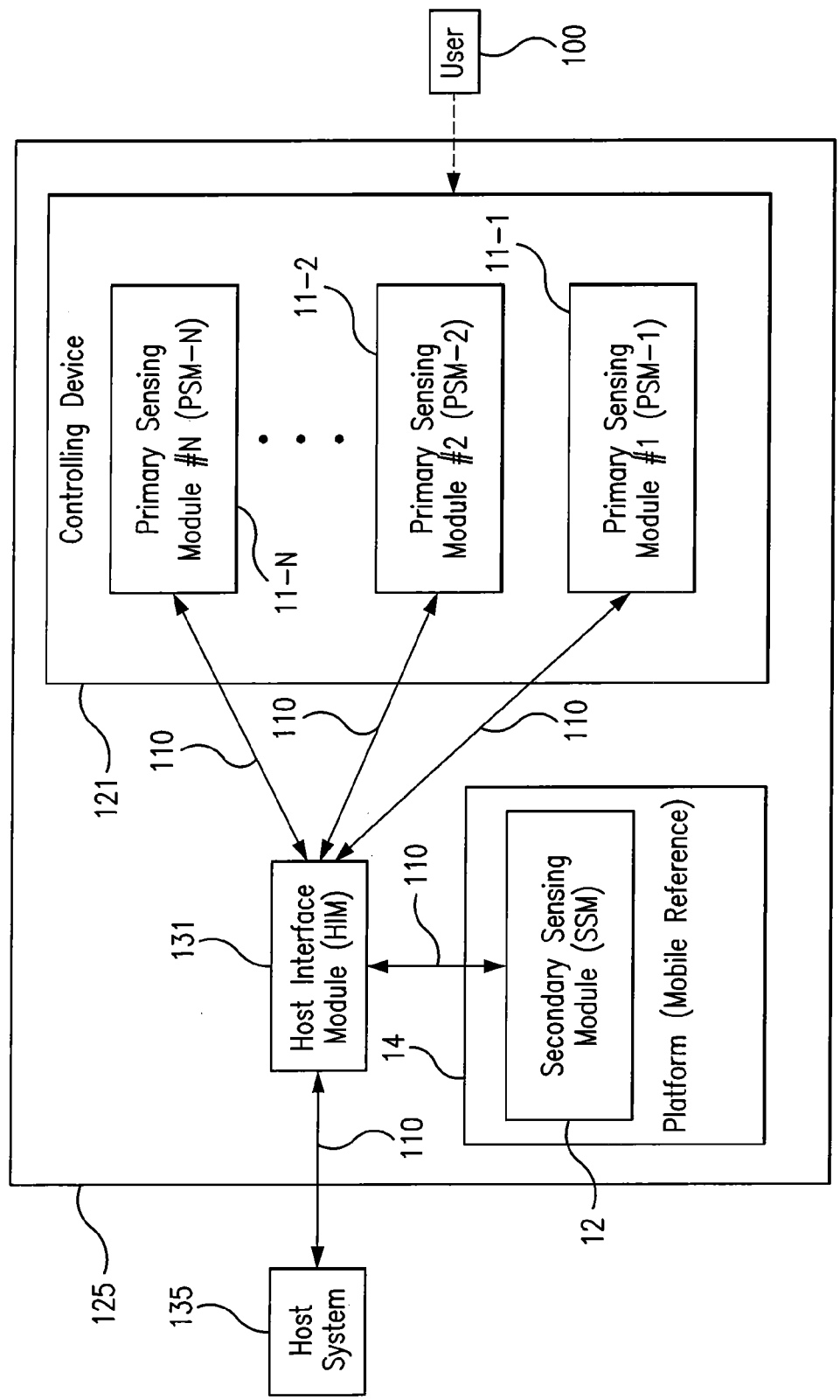
FIG. 12A schematically illustrates a Human Machine Interface (HMI) system including a Host Interface Module (HIM) connecting to a platform with an SSM, to a controller with a multiple PSMs, and to a host system, in accordance with another embodiment of the disclosure.

In additional embodiments, the PSM/SSM configuration shown in FIG. 12A can be re-arranged so that multiple PSM/SSM pairs are formed by using a given PSM as its neighbor's SSM at the same time, thereby creating a powerful sensing network in order to match the DOFs of a complex system.

Figure 12B:
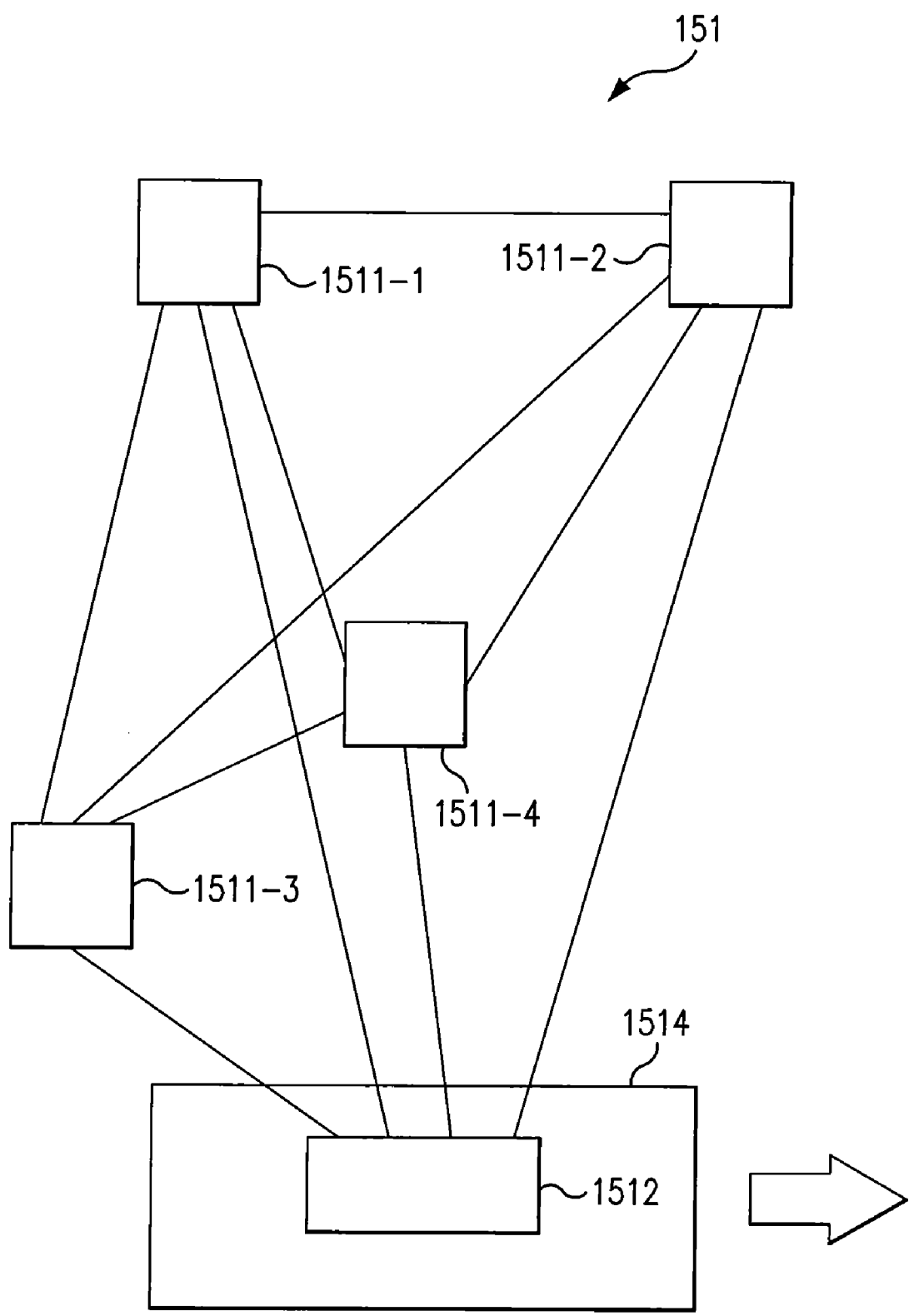
FIG. 12B schematically illustrates a moving platform communicating with a network of multiple interconnected PSMs, in accordance with another embodiment of the disclosure.

In further embodiments, multiple PSMs may be linked together to form a network 151, as shown schematically in FIG. 12B. The PSMs 1511-1, . . . , 1511-4, are linked to each other in network 151, as well as being linked to SSM 1512 on moving platform 1514.

One or more SSMs, or combined SSM/HIM modules, may also be mounted on the user (e.g. secured to the user's hand, arm or finger, or attached to or built into the user's clothing) and connected in a network to detect and cancel unintended user motion relative to the displacement controller. In addition, the host system may be configured to monitor the environment for adverse operating conditions (e.g. magnetic disturbances) causing loss of performance, and provide an indication thereof to the user. The user may then compensate for the loss of performance by using alternate motions or gestures, or instead using conventional devices to operate the DUC.

Figure 13:
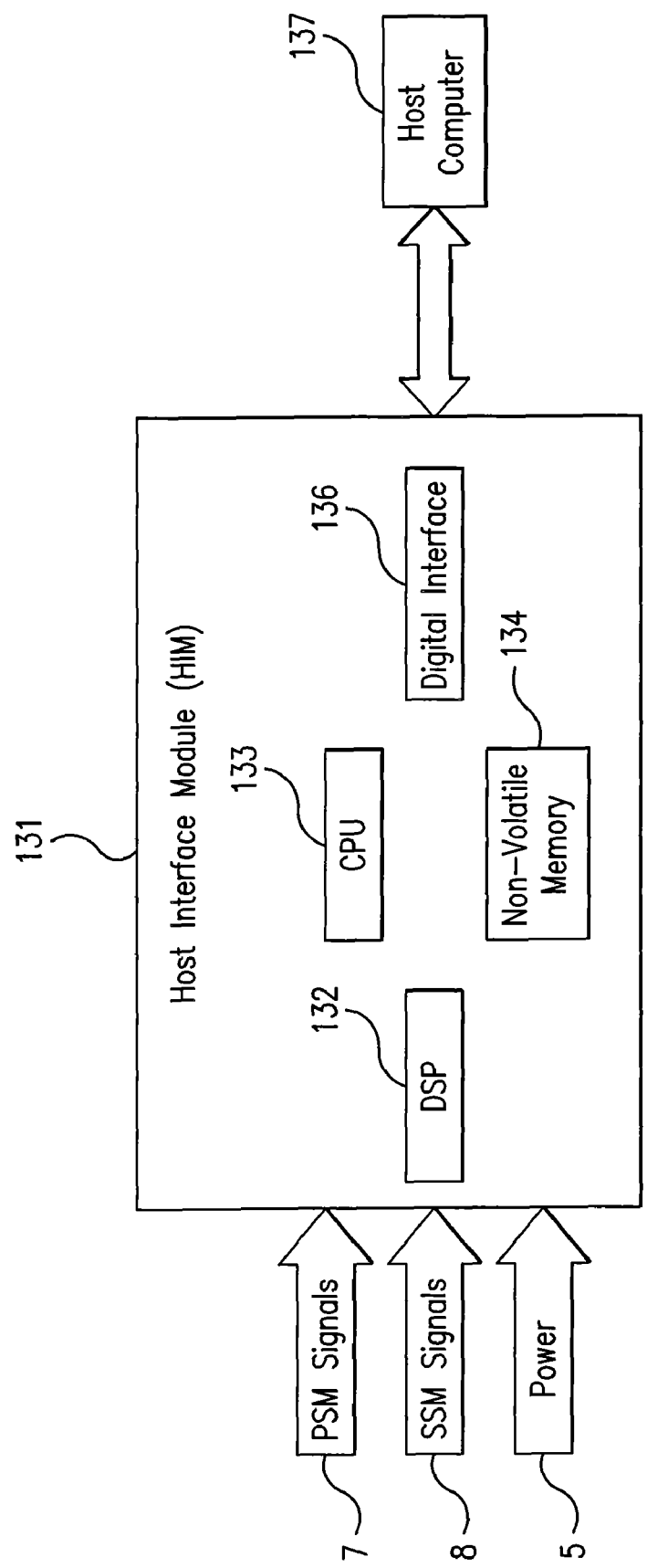
FIG. 13 schematically illustrates components of a HIM.

Some details of HIM 131 are shown schematically in FIG. 13. HIM 131 includes a CPU 133; a non-volatile memory 134; and a digital interface 136 for communicating with host computer 137. Software resident in HIM 131 includes software 132 for digital signal processing and command handling. Inputs to the HIM 131 include power 5, PSM signals 7, and SSM signals 8.

The host computer 137 or HIM 131 may have stored therein information relating to a plurality of users. In an embodiment, a stored user identifier is associated with that user's control motions and gestures, and is also associated with a security status of the user. (The security status of a user is sometimes referred to as a permission level for that user, indicating whether a user has permission to access certain features of the system.) The controlling effect of a user motion or gesture may be altered in accordance with the user's security status.

Figure 14:
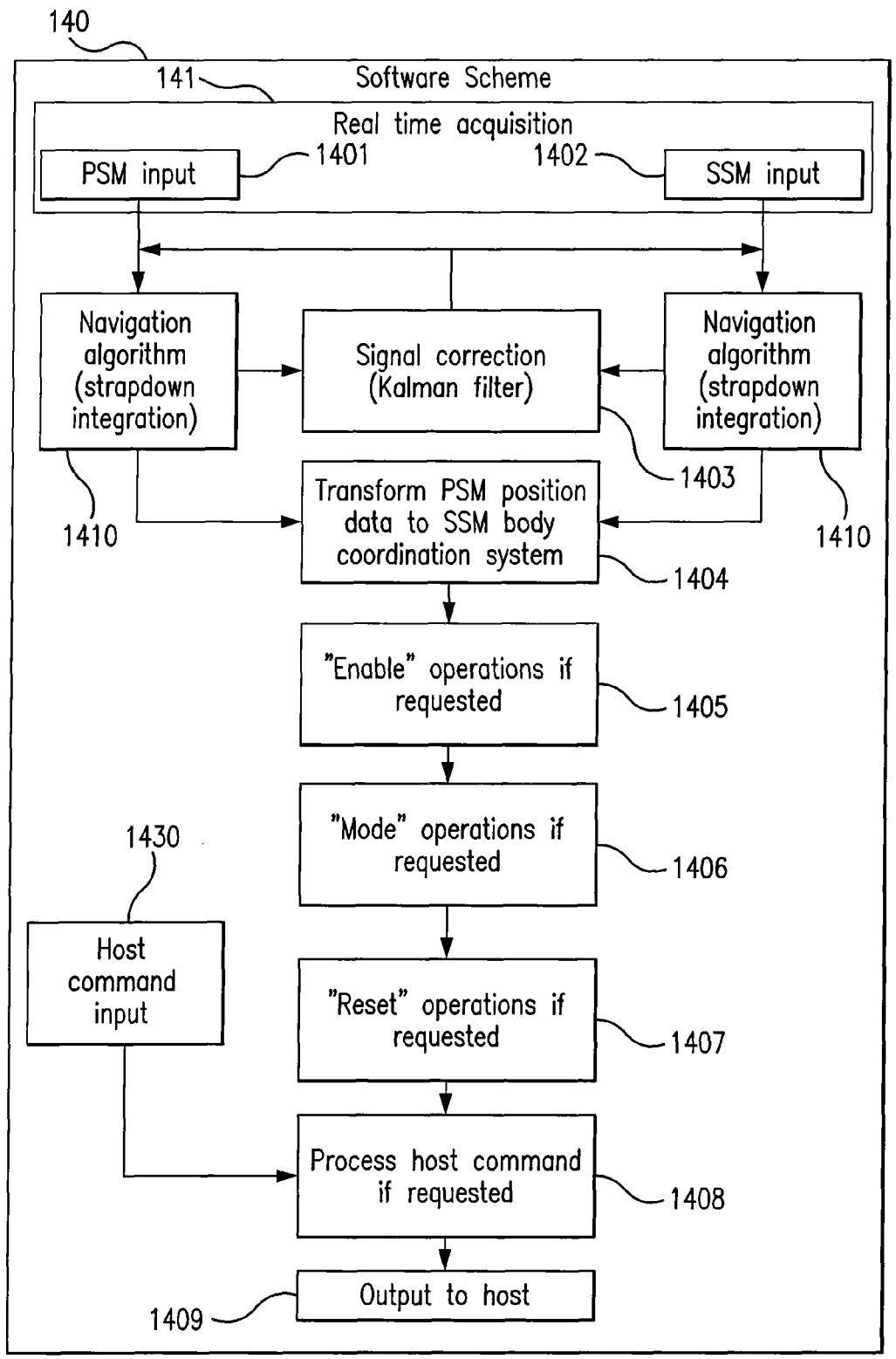
FIG. 14 schematically illustrates software executed by an HIM.

FIG. 14 shows the software scheme 140 for HIM 131, schematically illustrating software executed by CPU 133. A real-time signal acquisition procedure 141, accepts inputs 1401, 1402 from the PSM and SSM. Positional data including pitch, roll and yaw orientations are initially predicted using a navigation algorithm 1410, by integrating the angular rotation rates over time. This integration algorithm is similar to a strapdown algorithm commonly used for an inertial navigation system. To avoid drift induced by integration, the orientation data are then re-predicted by using accelerations. Since accelerations cannot distinguish between inertial and gravitational forces, drift errors with respect a given axis are resolved by using magnetometers. Because each geographic location has different magnetic field components and local distortions, the user needs to calibrate the device (using the "Mode" button; see FIG. 3B) at its first use or when there is a change in the control device's surroundings that may affect the magnetic field. Predicted results are subject to noise errors and thus further corrected by a Kalman filter 1403, which works well for normally distributed noise. As noted above with reference to FIG. 2, the PSM and SSM each measure accelerations and angular rotation rates in their respective body coordinate systems. Software component 1404 transforms the PSM positional data to the SSM body coordinate system, thereby relating the user's hand motions to the frame of reference of the device (e.g. vehicle) being controlled. Software components 1405, 1406, 1407 process inputs from the "Enable", "Mode" and "Reset" switches respectively, and initiate the corresponding operations (e.g. process inputs from the PSM while an "Enable" input is also present, and ignore inputs from the PSM otherwise). Additional software components 1430, 1408 input and process commands from the host system 135. (For example, in response to a command from the host 135, the CPU 133 might prepare an updated control instruction from the user, based on the PSM and SSM data.) The result of the processing by software 1408 is transferred to software 1409 for outputting to the host.

Embodiments of the present disclosure may thus be used in portable or fixed controls; single- or dual-use controls; and single axis, two-axis, or three-axis controls. Control devices constructed according to the disclosure may be used in a variety of applications, including control of cameras and forward-looking infrared (FLIR) imaging systems; flight control, including control of unmanned aerial vehicles; payload control; control of remote weapons, unmanned ground vehicles, unmanned surface water vehicles, and unmanned subsurface water vehicles; control of medical devices and robotic arms; and control of construction equipment and earth moving equipment. Furthermore, the compact and rugged nature of MEMS PSM and SSM components permits these control devices to be weapon-mounted or human-wearable in rugged environments (e.g. by gunners or special operations personnel). Other applications include wearable control devices for persons with disabilities or rehabilitation patients.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A device for controlling an entity, comprising:
    a displacement controller operable by a user of the device;
    a first sensing device attached to said displacement controller, the first sensing device configured to detect a controlling motion performed by the user;
    a second sensing device attached to the entity, the second sensing device configured to detect motion of the entity; and
    an interface device operatively connected to the first sensing device and the second sensing device, the interface device configured to
    receive signals from the first sensing device and from the second sensing device,
    process said signals to determine a relative motion of the controlling motion and the motion of the entity, and
    output a control signal for controlling the entity in accordance with the processed signals.

2. A device according to claim 1, wherein each of the first sensing device and the second sensing device is configured to detect motion in a plurality of degrees of freedom.

3. A device according to claim 2, wherein each of the first sensing device and the second sensing device comprises a three-axis accelerometer and a three-axis gyroscope.

4. A device according to claim 3, wherein
    each of the first sensing device and the second sensing device further comprises a three-axis magnetometer,
    the first sensing device detects the controlling motion relative to a first reference frame in accordance with a geomagnetic field local to the first sensing device, and
    the second sensing device detects the motion of the entity relative to a second reference frame in accordance with a geomagnetic field local to the second sensing device.

5. A device according to claim 4, wherein the accelerometers, the gyroscopes, and the magnetometers include microelectromechanical system (MEMS) devices.

6. A device according to claim 4, wherein the displacement controller further comprises at least one switch, and the first sensing device is configured to perform a calibration procedure relative to the geomagnetic field and earth gravitational field local to the first sensing device in accordance with activation of said switch.

7. A device according to claim 6, wherein said calibration procedure includes scaling motions of the user in accordance with dynamic properties of the entity.

8. A device according to claim 1, wherein the entity includes a mounting base having a cradle portion, and the displacement controller includes an adapter portion configured to mechanically connect to the cradle portion.

9. A device according to claim 1, wherein the displacement controller further comprises a wireless communication device, so that the first sensing device communicates wirelessly with the interface device.

10. A device according to claim 1, wherein the displacement controller further comprises a switch, and the first sensing device is configured so that the signals from the first sensing device are processed only while the switch is activated.

11. A device according to claim 1, wherein the displacement controller further comprises a switch, and the first sensing device is configured so that while said switch is activated, the displacement controller may be moved without altering a current displacement or orientation of the entity.

12. A device according to claim 1, wherein the displacement controller further comprises a switch, and the first sensing device is configured so that activation of said switch is effective to reestablish a reference frame of at least one of said first sensing device and said second sensing device.

13. A device according to claim 1, wherein said device is configured to perform a dynamic calibration procedure in accordance with motions performed by the user and detected by at least one of the first sensing device, the second sensing device, and the entity.

14. A device according to claim 1, wherein the second sensing device and the interface device are combined into one module.

15. A device according to claim 1, further comprising an additional sensing device mounted on the user and configured to detect motion of the user relative to the displacement controller.

16. A device according to claim 15, wherein said interface device is combined with said additional sensing device mounted on the user.

17. A device according to claim 1, wherein the entity is a weapon, an unmanned aerial vehicle, an unmanned ground vehicle, an unmanned surface water vehicle, an unmanned subsurface water vehicle, or a robotic device.

18. A device according to claim 1, wherein the displacement controller is a single-handle controller or a dual-handle controller configured for handling by the user.

19. A device according to claim 1, wherein the displacement controller is configured to be worn by the user.

20. A device according to claim 19, wherein the displacement controller is configured to be secured to a body member of the user, so that the user performs said controlling motion by movement of that body member.

21. A system for controlling a mechanism, comprising:
an operating device connected to the mechanism and configured to operate the mechanism;
a displacement controller operable by a user of the system;
a first sensing device attached to said displacement controller, the first sensing device configured to detect a controlling motion performed by the user;
a second sensing device attached to the mechanism, the second sensing device configured to detect motion of the mechanism; and
an interface device operatively connected to the first sensing device, the second sensing device, and the operating device, the interface device configured to
receive signals from the first sensing device and from the second sensing device,
process said signals to determine a relative motion of the controlling motion and the motion of the mechanism, and
output a control signal to the operating device so as to control the mechanism in accordance with the processed signals.

22. A system according to claim 21, wherein the operating device is a host computing device included in the mechanism.

23. A system according to claim 22, wherein the mechanism has the second sensing device, the interface device, and the host computing device located therein, and the mechanism further includes a mounting base to which the displacement controller is mechanically connected.

24. A system according to claim 22, wherein the mechanism includes a mounting base having a cradle portion, and the displacement controller includes an adapter portion configured to mechanically connect to the cradle portion, the displacement controller thereby being attachable to and detachable from the mounting base.

25. A system according to claim 21, wherein at least one of the operating device and the interface device includes a non-volatile memory and a display device,
the non-volatile memory is configured to store information relating to calibration motions of the user, and
the system is configured to control said mechanism in accordance with calibration motions of said user, in accordance with said user logging on to the system or selecting said user's name from a list of users displayed on the display device.

26. A system according to claim 25, further comprising a device for signaling to the user when the user executes a motion outside a range of calibrated motions.

27. A system according to claim 25, wherein
the non-volatile memory is configured to store information relating to a security status of the user, and
the system is configured to alter an effect of a motion performed by the user in accordance with said security status.

28. A system according to claim 21, wherein the mechanism is a weapon, an unmanned aerial vehicle, an unmanned ground vehicle, an unmanned surface water vehicle, an unmanned subsurface water vehicle, or a robotic device.

29. A system according to claim 21, wherein the displacement controller further comprises a wireless communication device, so that the first sensing device communicates wirelessly with the interface device.

30. A system according to claim 29, wherein
the mechanism is a vehicle;
the second sensing device, the interface device, and the operating device are located on the vehicle; and
the displacement controller has the first sensing device disposed therein and is remote from the vehicle.

31. A system according to claim 21, wherein each of the first sensing device and the second sensing device comprises at least one of an accelerometer, a gyroscope, and a magnetometer, each of the first sensing device and the second sensing device thereby configured to detect motion in a plurality of degrees of freedom.

32. A system according to claim 21, wherein each of the first sensing device and the second sensing device comprises an accelerometer, a gyroscope, and a magnetometer, each of the first sensing device and the second sensing device thereby configured to detect motion in a plurality of degrees of freedom,
the first sensing device detects the controlling motion relative to a first reference frame in accordance with a geomagnetic field local to the first sensing device, and
the second sensing device detects the motion of the mechanism relative to a second reference frame in accordance with a geomagnetic field local to the second sensing device.

33. A system according to claim 21, wherein each of the first sensing device and the second sensing device comprises a three-axis accelerometer, a three-axis gyroscope, and a three-axis magnetometer, each of the first sensing device and the second sensing device thereby configured to detect motion in six degrees of freedom,
the first sensing device detects the controlling motion relative to a first reference frame in accordance with a geomagnetic field local to the first sensing device, and
the second sensing device detects the motion of the mechanism relative to a second reference frame in accordance with a geomagnetic field local to the second sensing device.

34. A system according to claim 21, further comprising an additional sensing device mounted on the user and configured to detect motion of the user relative to the displacement controller.

35. A system according to claim 21, wherein the displacement controller is configured to be worn by the user.

36. A system according to claim 35, wherein the displacement controller is configured to be secured to a body member of the user, so that the user performs said controlling motion by movement of that body member.

37. A system according to claim 21, further comprising a monitoring device for monitoring environmental conditions relating to control of the mechanism, and an indicating device for indicating a level of control performance to the user.

38. A system according to claim 37, wherein the monitoring device is configured to detect a magnetic disturbance, and the indicating device is configured to indicate a loss of performance related to the magnetic disturbance.

39. A method comprising:
detecting a controlling motion by a first sensing device attached to a displacement controller, the controlling motion performed by a user of said controller;
detecting motion of an entity by a second sensing device attached to the entity;
receiving signals from the first sensing device and the second sensing device at an interface device;
processing said signals at the interface device to determine a relative motion of the controlling motion and the motion of the entity; and outputting a control signal from the interface device to control the entity in accordance with the processed signals.

40. A method according to claim 39, wherein
each of the first sensing device and the second sensing device includes a three-axis magnetometer,
the first sensing device detects the controlling motion in six degrees of freedom relative to a first reference frame in accordance with a geomagnetic field local to the first sensing device, and
the second sensing device detects the motion of the entity in six degrees of freedom relative to a second reference frame in accordance with a geomagnetic field local to the second sensing device.

41. A method according to claim 40, wherein the displacement controller includes at least one switch, and further comprising the step of performing a calibration procedure relative to the geomagnetic field local and earth gravitational field local to the first sensing device in accordance with activation of said switch.

42. A method according to claim 41, wherein said calibration procedure includes scaling motions of the user in accordance with dynamic properties of the entity.

43. A method according to claim 40, further comprising monitoring movement of the entity,
monitoring motions performed by the user, and
performing a dynamic calibration procedure in accordance with said movement of the entity and said motions performed by the user.

44. A method according to claim 39, wherein the displacement controller includes a switch, and said processing step further comprises processing the signals from the first sensing device only while the switch is activated.

45. A method according to claim 39, wherein the entity is a weapon, an unmanned aerial vehicle, an unmanned ground vehicle, an unmanned surface water vehicle, an unmanned subsurface water vehicle, or a robotic device.

46. A method according to claim 39, wherein the controlling motion is performed by the user handling a single-handle controller or a dual-handle controller.

47. A method according to claim 39, wherein the displacement controller is configured to be worn by the user.

48. A method according to claim 47, wherein the displacement controller is configured to be secured to a body member of the user, so that the user performs said controlling motion by movement of that body member.

49. A method according to claim 39, further comprising
monitoring environmental conditions relating to control of the mechanism, and
indicating a level of control performance to the user.

50. A method according to claim 49, wherein said monitoring includes detecting a magnetic disturbance, and said indicating includes indicating a loss of performance related to the magnetic disturbance.

* * * * *